United States Patent
Agon et al.

(10) Patent No.: US 10,939,779 B2
(45) Date of Patent: Mar. 9, 2021

(54) SHALLOW MACHINE

(71) Applicant: NESTEC S.A., Vevey (CH)

(72) Inventors: Fabien Ludovic Agon, Valeyres-sous-Rances (CH); Da Mi Byun, Lausanne (CH); Bianca Hanauer, Munich (DE); Marco Magatti, Lausanne (CH); Markus Johannes Mayer, Munich (DE); Matthias Schmiedbauer, Munich (DE)

(73) Assignee: Societe des Produits Nestle S.A., Vevey (CH)

( * ) Notice: Subject to any disclaimer, the term of this patent is extended or adjusted under 35 U.S.C. 154(b) by 262 days.

(21) Appl. No.: 15/561,131

(22) PCT Filed: Mar. 30, 2016

(86) PCT No.: PCT/EP2016/056875
§ 371 (c)(1),
(2) Date: Sep. 25, 2017

(87) PCT Pub. No.: WO2016/156364
PCT Pub. Date: Oct. 6, 2016

(65) Prior Publication Data
US 2018/0049583 A1    Feb. 22, 2018

(30) Foreign Application Priority Data
Apr. 2, 2015 (EP) ................... 15162302

(51) Int. Cl.
*A47J 31/44* (2006.01)
*A47J 31/36* (2006.01)

(52) U.S. Cl.
CPC ....... *A47J 31/4482* (2013.01); *A47J 31/3623* (2013.01)

(58) Field of Classification Search
CPC .... A47J 31/4482; A47J 31/405; A47J 31/407; A47J 31/4425; A47J 31/3623;
(Continued)

(56) References Cited

U.S. PATENT DOCUMENTS

| 7,600,466 B2 * | 10/2009 | Ruckstuhl ........... A47J 31/3676 99/289 R |
| 2011/0041696 A1 * | 2/2011 | Aemisegger ........ A47J 31/3623 99/281 |

(Continued)

FOREIGN PATENT DOCUMENTS

| EP | 2570059 | 3/2013 |
| WO | 2008123003 | 10/2008 |

(Continued)

OTHER PUBLICATIONS

Webster definition to "Skew" (Year: 2020).*
(Continued)

*Primary Examiner* — Tu B Hoang
*Assistant Examiner* — Bonita Khlok
(74) *Attorney, Agent, or Firm* — K&L Gates LLP

(57) ABSTRACT

A machine (1) for dispensing a beverage (84) from a capsule (2) has: an external housing (10, 30, 30', 40, 50, 60) having an external front face (10), two external spaced-apart lateral side faces (30,30') that extend rearwards behind the external front face (10) and that face each other; a beverage outlet (11) located on the external front face (10) and above a front area (20) for placing a user-receptacle (3,4) for collecting beverage (84) from the outlet (11); and a capsule handling device (70) that has a first part (71) and a second part (72) that are relatively movable between a capsule transfer position and a capsule extraction position. At least one part (72) of the first and second parts (71,72) is arranged to translate towards and away from at least one of the two external lateral side faces (30,30') so that the first and second parts (71,72) relatively move between the transfer and the extraction positions.

19 Claims, 3 Drawing Sheets

(58) Field of Classification Search
CPC ............... A47J 31/3638; A47J 31/3695; A47J 31/0668; A47J 31/369; A47B 81/00
USPC ..................... 99/323, 272–322, 452, 453
See application file for complete search history.

(56) References Cited

U.S. PATENT DOCUMENTS

| | | | | |
|---|---|---|---|---|
| 2013/0298778 | A1* | 11/2013 | Cahen | ............... A47J 31/3676 99/295 |
| 2015/0048729 | A1* | 2/2015 | Cahen | ............... A47J 31/4428 312/237 |

FOREIGN PATENT DOCUMENTS

| | | |
|---|---|---|
| WO | 2009022364 A2 | 2/2009 |
| WO | 2012007313 | 1/2012 |
| WO | 2013104636 | 7/2013 |
| WO | 2011154492 | 12/2013 |
| WO | 2013186339 | 12/2013 |

OTHER PUBLICATIONS

Vocabulary definition to "adjacent" (Year: 2020).*
European office Action for Appl No. 16 712 054.2-1006 dated Dec. 13, 2019.

* cited by examiner

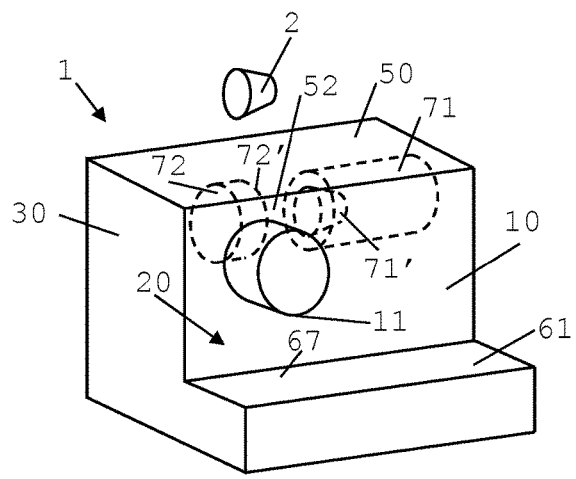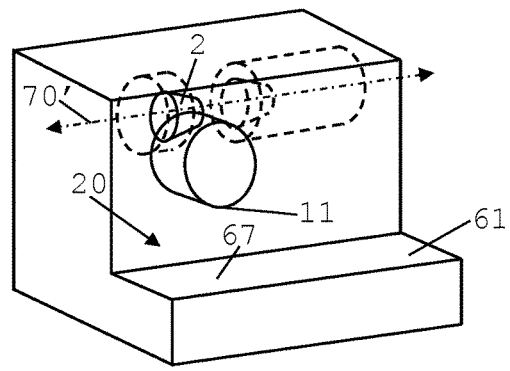
Fig. 3a  Fig. 3b
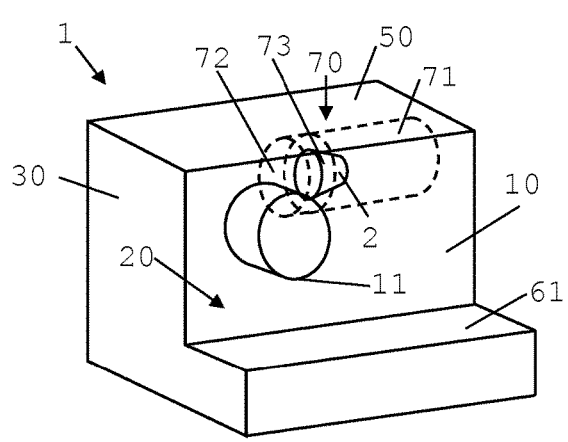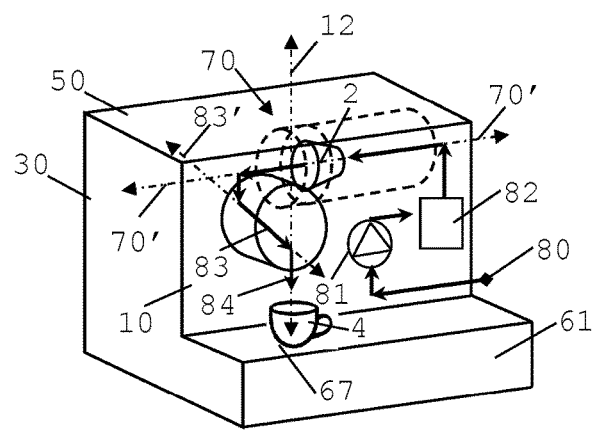
Fig. 3c  Fig. 3d

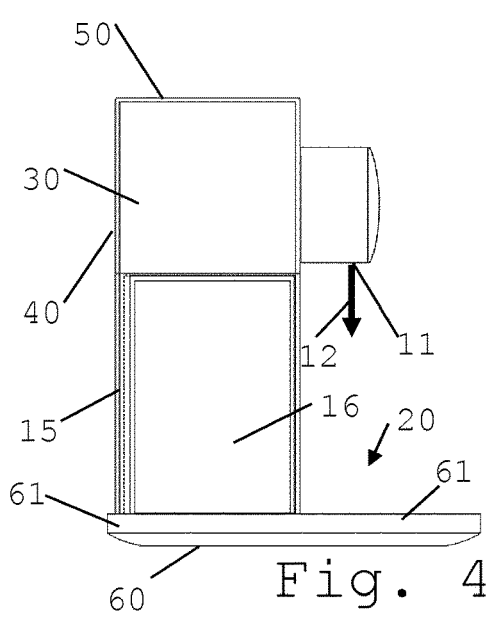
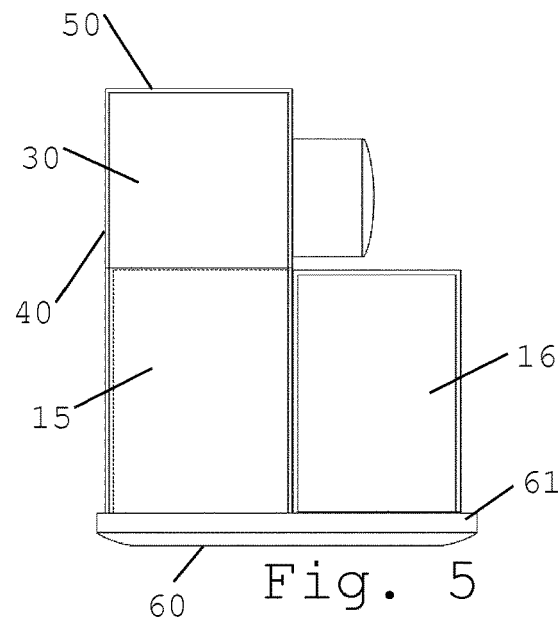
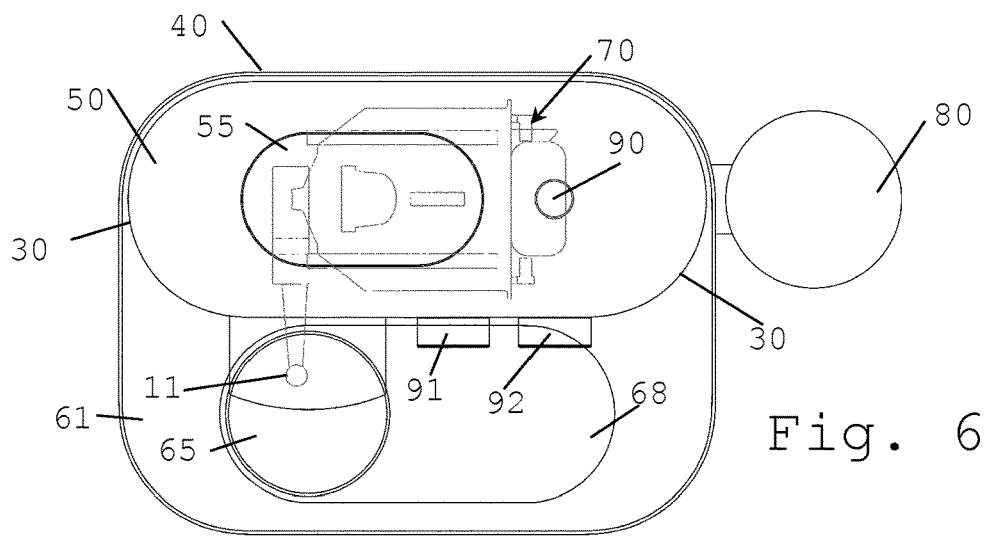
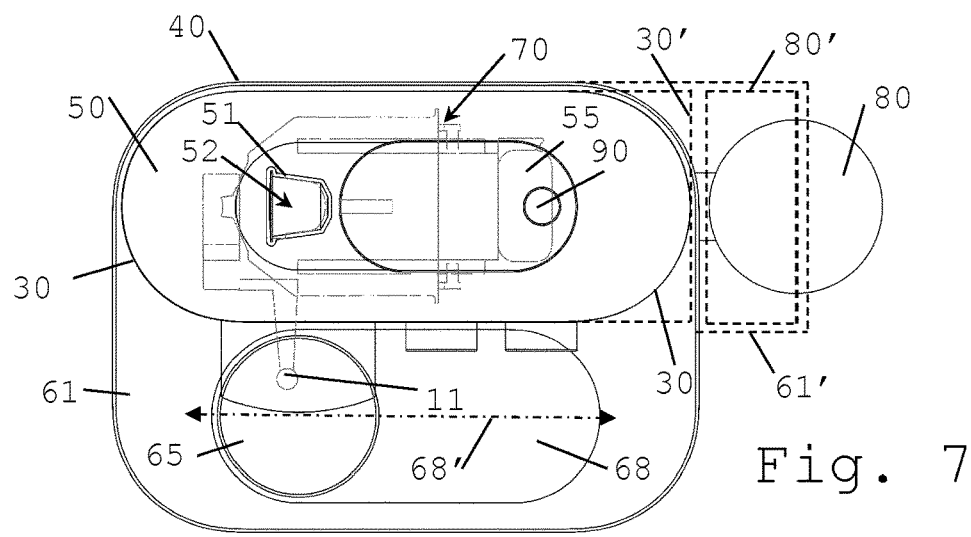

SHALLOW MACHINE

CROSS REFERENCE TO RELATED APPLICATIONS

The present application is a National Stage of International Application No. PCT/EP2016/056875, filed on Mar. 30, 2016, which claims priority to European Patent Application No. 15162302.2, filed on Apr. 2, 2015, the entire contents of which are being incorporated herein by reference.

FIELD OF THE INVENTION

The field of the invention pertains to beverage dispensing machines with convenient dimensions, such as beverage machines using capsules of an ingredient of the beverage to be prepared.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Examples of fluid circuits are disclosed in U.S. Pat. Nos. 2,715,868, 5,392,694, 5,943,472, 5,992,298, 6,554,588, WO 2006/032599, WO 2009/024500, WO 2009/150030 and WO 2010/006953. The brewing unit may be manual, as for instance disclosed in WO 2005/004683, WO2007/135136 and WO 2009/043630, or motorized, as for instance disclosed in EP1767129, WO 2012/025258, WO 2012/025259, WO 2012/093108, WO 2013/127476, WO 2014/056642, WO 2014/056821, WO 2014/060370, WO 2014/096122, WO 2014/096123, EP2014163793.4 and EP14163810.6, and the references cited therein.

The machines may be arranged to dispense beverages for small and large cups. Arrangements to properly position the cups under the outlet are known. Examples of such machines are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP2014198712.3, EP2014198710.7 and EP2014198715.6, and the references cited therein.

Such machines are usually arranged to be placed at some convenient location on a support surface in a kitchen or bar or in an office or in another suitable environment, typically close to the mains and to a source of water such as close to the kitchen sink, and are not easily movable. Moveable coffee machine are however known as disclosed in EP 1 878 368 and EP 1 864 598, and the references cited therein.

With the view of reducing the machine's footprint or operating volume, it is known to integrate the machine components, e.g. as disclosed in WO 2009/130099, WO 2012/072764, WO 2012/072766, WO 2012/093107, WO 2012/126971, WO 2013/127906. To adapt the shape of the machine to different environments, it is known to makes the machine articulated, e.g. as disclosed in WO 2012/055767 and WO 2013/104643.

SUMMARY OF THE INVENTION

An objective of the invention is to provide a solution or at least an alternative to the prior art configurations. A particular object of the invention is to provide a beverage dispensing machine that can be conveniently positioned for operation, e.g. on a narrow shelf.

The invention thus relates to machines for dispensing a beverage from a capsule containing a beverage ingredient.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

The machine has an external housing having an external a front face, two external spaced-apart lateral side faces that extend rearwards behind the external front face and that face each other. The machine may have at least one of an external rear face, an external top face and an external bottom face.

The machine includes a beverage outlet located on the external front face and above a front area for placing a user-receptacle, e.g. a cup or a mug, for collecting beverage dispensed from the outlet.

Suitable advanced beverage outlet configurations, that include drop management arrangements, are for instance disclosed in WO 2006/050769, WO 2012/072758, WO 2013/127907, EP2014186738.2, EP2014195048.5 and EP14195067.5. For the purpose of implementing the present invention, such drop management is optional. For instance, a simple machine outlet of the type disclosed in U.S. Pat. No. 8,091,469 or WO 2009/074550 can be used.

The front area may have a movable user-receptacle support body, such as a support body that is movable between a first position for placing a short user-receptacle under the outlet and a second position for placing a large user-receptacle under the outlet. For instance, the user-receptacle body is a body that is:

vertically translatable between different positions for supporting user-recipients under the outlet, e.g. as disclosed in WO 2006/050769;

movable within the machine from under the outlet between a first position for supporting a short user-recipient under the outlet and a second position position for leaving a free space for receiving a tall user-recipient under the outlet under the outlet, e.g. as disclosed in EP1867260, WO2009/074557, WO 2011/154492 and WO 2012/007313, the free space being either formed by a support surface of the machine (e.g. a machine foot) or a support surface external to the machine (e.g. a shelf, a kitchen or dining table or any generally stable and horizontal surface that is able to support the weight of the machine and the user-recipient); or removable from the machine (and reconnectable thereto) from a position for supporting a short user-recipient under the outlet to a position external to the machine for leaving a free space for receiving a tall user-recipient under the outlet under the outlet, e.g. as disclosed in EP1731065, WO 2013/104636, EP 2014198712.3 and EP 2014198715.6.

The machine may be configured to dispense the beverage from the beverage outlet to cups of different sizes, in particular to short cups, e.g. espresso cups, and tall cups such as mugs, e.g. cappuccino cups.

The machine further includes two external spaced-apart lateral side faces that extend rearwards behind the external front face and that face each other. Optionally, the machine has at least one of an external rear face, an external top face and an external bottom face.

The machine may have a generally prismatic, e.g. parallelepipedic, main body over which the housing extends.

The machine has a capsule handling device that is located behind the external front face and that is fluidically connected to the outlet. The device has a first part and a second part that are relatively movable between a transfer position for receiving and/or evacuating the capsule and an extraction position for extracting the capsule between the first and second parts. For instance, the first and second parts are:
- movable manually, such as by a user-handle, and/or movable automatically, such as by a motor, between the transfer and the extraction positions; and/or
- arranged to form in the extraction position a mixing chamber for housing the capsule, e.g. a brewing chamber, such as a chamber delimited by at least a cavity in one part of the first and second parts and by a cooperating cavity or lid formed by the other part of the first and second parts.

Examples of suitable capsule handling devices, as well as their actuation (manual, automatic, semi-automatic, or fully motorized) and integration into a beverage machine, are provided in greater details in EP 1 646 305, EP 1 859 713, EP 1 859 714, WO 2009/043630, WO 2012/025258 and WO 2013/127476 and in the other references cited above.

The beverage preparation machine can be an in-home or out of home machine. The machine may be a coffee, tea, chocolate, cacao, milk, soup, baby food, etc . . . preparation machine. The machine may be arranged for preparing within a beverage processing module, which includes the above capsule handling device, a beverage by passing hot or cold water or another liquid through a capsule containing an ingredient, such as a flavoring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, e.g. in a concentrate form. A carrier or dilution liquid, e.g. water, may be mixed with such ingredient to form the beverage.

For instance, a predetermined amount of beverage is formed and dispensed on user-request, which corresponds to a serving. The volume of such a serving may be in the range of 25 to 200 ml or up to 300 or 400 ml, e.g. the volume for filling a cup or mug, depending on the type of beverage. Formed and dispensed beverages may be selected from ristrettos, espressos, lungos, cappuccinos, café latte, americano coffees, teas, etc. . . . . A coffee machine may be configured for dispensing espressos, e.g. an adjustable volume of 20 to 60 ml per serving, and/or for dispensing lungos, e.g. a volume in the range of 70 to 150 ml per serving.

The beverage preparation module may be connected to a source of liquid, e.g. water.

The source may be a liquid reservoir. Further details on suitable reservoirs are for example disclosed in WO2007/135136, WO 2010/128109, WO 2011/083103, WO 2011/089210 and EP 2 228 633.

Alternatively, the module can be connected directly to the tap that serves as a source of liquid, e.g. water.

The module can include at least one of a liquid driver, a thermal conditioner and a beverage mixing cavity e.g. a chamber controlled by an actuator for receiving a beverage ingredient via an ingredient passage. The ingredient may be mixed in the chamber with the liquid to prepare the beverage. Such an ingredient may be provided within a capsule.

Examples of modules provided with a fluid circuit including a thermal conditioner and/or a liquid driver are disclosed in EP 1 253 844, EP 1 380 243 and EP 1 809 151, WO 2009/074550, WO 2009/130099, WO 2009/150030, WO 2010/108700, WO 2011/107574 and WO 2013/098173.

In accordance with the invention, at least one of the first and second parts of the capsule handling device is arranged to translate towards and away at least one of the two external lateral side faces when the first and second parts relatively move between the transfer and the extraction positions.

Such a configuration departs from a standard state of the art configurations, e.g. as disclosed in WO 2009/043630, in which the capsule handling device extends and moves longitudinally orthogonally to the machine's front face. In the latter configuration the machine extends narrowly behind the front face over a significant depth. In the present configuration, the machine has a large front face that extends over a short depth. Consequently, the machine can be placed on a support surface that has a short depth, e.g. a shelf.

Typically the machine may have an overall depth over its overall height of 10 to 30 cm, e.g. 15 to 25 cm. The overall height of the machine may be of the order of 20 to 35 cm, e.g. 25 to 30 cm. The machine's overall width can be about 25 to 45 cm, e.g. 35 to 40 cm.

At least one of the first and second parts that is arranged to translate towards and away from the external lateral side face(s) can be configured to move generally in parallel to at least one of: the external front face; the external rear face (when present); the external top face (when present); and the external bottom face (when present).

The first and second parts can be relatively movable between a transfer position for receiving and/or evacuating the capsule and an extraction position for extracting the capsule between the first and second parts, the first and second parts being movable along a translation axis that intercepts at least one of the first and second external lateral side faces. Optionally, the translation axis extends generally in parallel to at least one of: the external front face; the external rear face (when present); the external top face (when present); and the external bottom face (when present).

The machine typically comprises a fluid circuit for circulating beverage ingredient from the capsule when extracted between the first and second parts.

Examples of fluid circuits are disclosed in WO 2009/074550 and WO 2009/130099, the fluid sequence of which can be adapted in a machine according to the present invention.

For instance, the fluid circuit is fluidically connected to a source of liquid and comprises a liquid driver, such as a pump, for driving the liquid from the source into the capsule handling device for feeding this liquid to the capsule (and combining the liquid with the beverage ingredient of the capsule), for instance via a temperature conditioner, such as a heater and/or a cooler, and via an inlet of the first or second part.

Examples of modules provided with a fluid circuit including a thermal conditioner and/or a liquid driver are disclosed in EP 1 253 844, EP 1 380 243 and EP 1 809 151, WO 2009/074550, WO 2009/130099, WO 2009/150030, WO 2010/108700, WO 2011/107574 and WO 2013/098173.

The machine may include a user-interface configured to control the liquid driver to drive the liquid from the source of liquid into the capsule handling device.

The machine may have one or more further user-interfaces such as further user-interfaces for setting at least one parameter relating to beverage preparation, power management and machine servicing. Such beverage preparation parameters may relate to the beverage volumes, beverage temperatures as well as preparation sequences, such as beverages made of different phases such as more or less separate coffee and milk phases, e.g. cappuccinos and latte machiattos.

Typically, the user-interface(s) is/are connected to a control unit that controls the machine elements active for preparing the beverage. Such control units and active elements, e.g. liquid driver and thermal conditioner, etc . . . are well known in the art of beverage machines.

At least one of the first and second parts that is arranged to translate towards and away from the external lateral side face(s) can be arranged to move generally in parallel to an overall direction of extraction of the beverage ingredient in the capsule when extracted between the first and second parts.

The machine may include a fluid guide for fluidically connecting the capsule handling device to the outlet along a guide direction, the overall direction of extraction and a direction of dispensing of the beverage out of the outlet extending along skew lines. For instance, the dispensing direction and the guide direction are in a plane that is generally orthogonal to the overall direction of extraction.

The machine can have a foot projecting in front of the external front face and extending along the external front face to form and/or support the front area.

The machine may include a movable user-receptacle support body that has an upper placement surface and that is movable along the external front face:
  from a first position at the front area under the outlet for supporting on the upper placement surface a short user-receptacle under the outlet;
  to a second position away from under the outlet so that a large user-receptacle is placeable on a lower placement surface under the outlet.

Optionally, the foot forms the lower placement surface and/or supports the movable user-receptacle support body in at least one of the first and second positions.

The movable user-receptacle support body can be secured to the external front face and/or to the above foot.

The machine can have a connection means for connecting the user-receptacle support body to the external front face, the user-receptacle support body having a connector that is connected or connectable to the connection means to maintain the user-receptacle body in the first and second positions. For instance, the connection means guides the user-receptacle body from the first position into the second position and vice versa.

Hence, the support body may be in connection with the connection means during the entire travel from the first position to the second position and vice versa. Consequently, the travel direction of the support body between the first and second positions can be entirely determined by the configuration of the connection means from the first to the second positions and vice versa.

The connection means can be located on the external front face and/or on the above foot.

The connection means can have a direction that extends generally along a bottom part of the external front face so that the user-receptacle support body is movable with its connector in connection with the connection means from the first position into the second position and vice versa along the direction extending along the bottom part. For instance, the direction of the connection means extends on: the bottom part of the external front face; and/or a front area formed by a machine foot projecting in front of the bottom part of the external front face and extending along the external front face.

The machine may have a machine bottom face, the direction of the connection means being generally parallel to the bottom face.

The machine can have two external spaced-apart lateral side faces, the user-receptacle support body being movable with its connector in connection with the connection means from the first position into the second position and vice versa along this direction (that extends generally along a bottom part of the external front face) from adjacent or close to one external lateral side face to adjacent or close to the other external lateral side face.

The connection means may be provided with a mechanical arrangement comprising at least one of:
  a rail cooperating with a rail connector of the support body and/or a groove cooperating with a groove connector of the support body, such as a rail slider and/or groove slider of the support body having a single degree of freedom along the rail and/or the groove when connected thereto, the rail and/or groove and the rail and/or groove slider having optionally a generally dovetail shape for cooperating together along a single degree of freedom;
  a belt or chain secured to the support body and movable along the external front face, such as a belt or chain in an open or closed loop; and
  a local releasable positioner for guiding the support body into the first position or second position, such as a plug-and-socket positioner or a hook positioner or a snap positioner.

The connection means may be provided with a magnetic arrangement so that the connection means and the connector are magnetically constrained.

The connector may include a magnetic field-generating element that is arranged to be magnetically constrained against a corresponding ferromagnetic element of the connection means.

The connection means can have a magnetic field-generating element that is arranged to be magnetically constrained against a corresponding ferromagnetic element of the connector.

The connection means can comprise a magnetic field-generating element that is arranged to be magnetically constrained against a corresponding magnetic field-generating element of the connector.

The magnetic field-generating element may include an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

The ferromagnetic element can be made of at least one of of Co, Fe, $Fe_2O_3$, $FeOFe_2O_3$, $NiOFe_2O_3$, $CuOFe_2O_3$, $MgO Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

Such magnetic field-generative element and/or such ferromagnetic element can be made of sub-elements dispersed in a polymer matrix or agglomerated with binder.

The connector can comprise one or more magnetic and/or ferromagnetic elements, e.g. pin or rod or cylinder or prism or spot element, the connection means comprising:
  one or more magnetic and/or ferromagnetic local positioner elements, e.g. pin or rod or cylinder or prism or spot element, on a path of the connector when the user-receptacle support body is moved between the first and second positions along said direction generally extending along the bottom part, such as at least one of discrete end-of-path positioners and intermediate positioners, e.g. a plurality of spaced apart positioners; and/or
  one or more path elements along a path of the connector when the user-receptacle support body is moved between the first and second positions along the above direction generally extending along the bottom part, optionally the connection means comprising stripe or bar or wire elements or a plurality of side-by-side local positioner elements along this direction to from a spotted path and/or end-of-path positioners defining the first and second positions of the user-receptacle support body.

The machine may include a liquid reservoir, such as a water thank, the liquid reservoir being in fluid connection with the fluid circuit.

The liquid reservoir can be removable from such machine for servicing, such as for filling, emptying and/or cleaning.

The liquid reservoir may be mounted on a machine foot, such as the above machine foot, which machine foot projects beyond:
  at least one of the external lateral side faces, the reservoir being located adjacent to one of the external side faces;
  the external front face, the reservoir being located adjacent to the external front face; or
  the external rear face (when present), the reservoir being located adjacent to the external rear face.

The liquid reservoir can have a shape that extends over substantially at least one of the entire external lateral side face and/or over substantially the entire external rear face.

The liquid reservoir may have a shape that is generally parallelepipedic.

The liquid reservoir can have a shape that is generally cylindrical with a circular or part-circular or crescent or elliptic or semi-elliptic base.

The machine can include a seat for receiving a removable service unit via an opening in the external front face.

The service unit may comprise a receptacle for collecting waste material such as capsules upon use and/or residual liquid.

The service unit can have a feeder for supplying the beverage ingredient capsules and/or another ingredient for forming the beverage to be dispensed and/or a cleaning agent.

The service unit may be prevented from being removed or inserted into the seat by the above user-receptacle support body when the support body is adjacent to and in front of the opening:
  in the first position of the body, the service unit being removable or insertable into the seat when the support body is in the second position; or
  in the second position of the body, the service unit being removable or insertable into the seat when the support body is in the first position.

Examples of service units are disclosed in EP 1 731 065, EP 1 867 260, WO 2009/013778, WO 2009/074559, WO 2009/135869, WO 2010/128109, WO 2011/086087 and WO 2011/086088.

Hence, when the machine is mainly intended to be used for serving small beverages into short user-receptacle, the seat's opening for service unit may be located adjacent to and behind the support body in the first position, so that the service unit is prevented from being removed from the seat during the main use of the machine. Likewise, when the machine is mainly intended to be used for serving large beverages into short user-receptacle, the seat's opening for service unit may be located adjacent to and behind the support body in the second position, so that the service unit is prevented from being removed from the seat during the main use of the machine.

The capsule handling device can be so arranged as to evacuate the capsule to the removable service unit when located in the seat.

The external top face (when present) can have a capsule insertion opening leading into a passage for guiding the capsule to the capsule handling device and to a position between the first and second parts of the handling device in the transfer position which parts are then relatively movable to their extraction position for extracting the capsule. For instance, the capsule insertion opening is associated with a cover that is movable adjacent to the external housing, such as slidable and/or pivotable, between an open position away from the opening for allowing insertion of the capsule into the passage via the opening and a closed position over or across the opening to prevent insertion of the capsule into the passage via the opening.

Examples of such passages and covers are for example disclosed in WO2007/135136, WO 2012/072766, WO 2012/093107, WO 2012/126971, WO 2013/127906, WO 2014/056641, WO 2014/056642 and PCT/EP14/076211.

The machine may include a user-interface which is operable by a user to extract the capsule between the first and second parts in their extraction position, optionally the user-interface being:
  covered by the cover when the cover is in the open position so that the user-interface is inoperable by the user when the capsule handling device is accessible from outside via the opening and the passage; and
  uncovered by the cover when the cover is in the closed position so that the user-interface is operable by the user when the capsule handling device is inaccessible from outside via the opening and the passage.

The user-interface can be configured to control the above liquid driver to drive the liquid from the source of liquid into the capsule handling device.

Hence, a user is prevented from operating the user-interface when the cover is not covering the opening. When the user-interface controls the circulation of liquid in the capsule handling device, the cover must first be moved onto the opening leading to the capsule handling device so that the user is not exposed to liquid or gas projections from the capsule handling device. Likewise, when the user-interface controls the relative movement of the first and second parts of the capsule handling device, the opening leading to the capsule handling device must first be covered by the cover before the user-interface can be operated by the user to cause the relative movement of the first and second parts of the capsule handling device, whereby the user is inhibited from sticking body parts (e.g. a finger) via the opening into the capsule handling device when the first and second parts are relatively moving.

In the context of the present disclosure, the relative orientation of the machine, e.g. references to the machine's top, front, bottom, side, rear, etc., unless specified otherwise, typically relate to the orientation of operation of the machine, e.g. on top of a table, with the machine's outlet in front of a user for naturally operating the machine to dispense a beverage.

BRIEF DESCRIPTION OF THE DRAWINGS

The invention will now be described with reference to the schematic drawings, wherein:

FIGS. 3a to 3d illustrate schematically the operation and the fluid line of a capsule handling device of the machine of FIGS. 1 and 2;

FIGS. 4 and 5 are side view of the beverage machine shown in FIGS. 1 and 2 with a service unit inserted into and removed from its machine as illustrated in FIGS. 4 and 5, respectively; and FIGS. 6 and 7 are top views of the beverage machine shown in FIGS. 1 and 2 with a cover for covering a capsule insertion opening, the cover being in the closed position over and across the opening and in the open position away from the opening, as illustrated in FIGS. 6 and 7, respectively.

DETAILED DESCRIPTION

Figure 1:
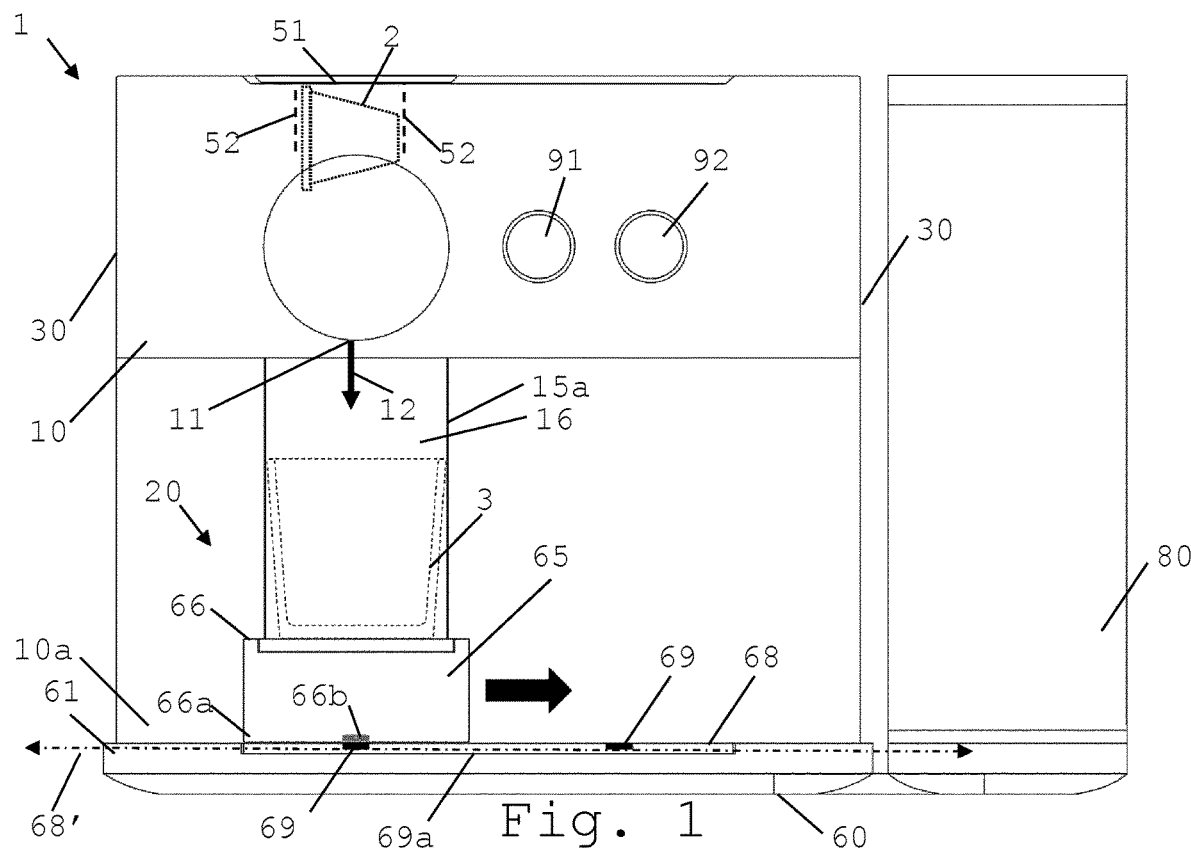
FIGS. 1 and 2 are front views of a beverage machine according to the invention having a beverage outlet and a cup support that is movable under the outlet for placing a small cup under the outlet and movable away from under the outlet for placing a large cup under the outlet as illustrated in FIGS. 1 and 2, respectively.

As illustrated in FIGS. 1 to 7, an exemplary embodiment of a machine 1 according to the invention is configured for dispensing a beverage 84 from a capsule 2 containing a beverage ingredient.

Machine 1 has an external housing 10,30,30',40,50,60 with an external front face 10 and two external spaced-apart lateral side faces 30,30' that extend rearwards behind external front face 10 and that face each other. External housing 10,30,30',40,50,60 may include at least one of an external rear face 40, an external top face 50 and an external bottom face 60.

Figure 2:
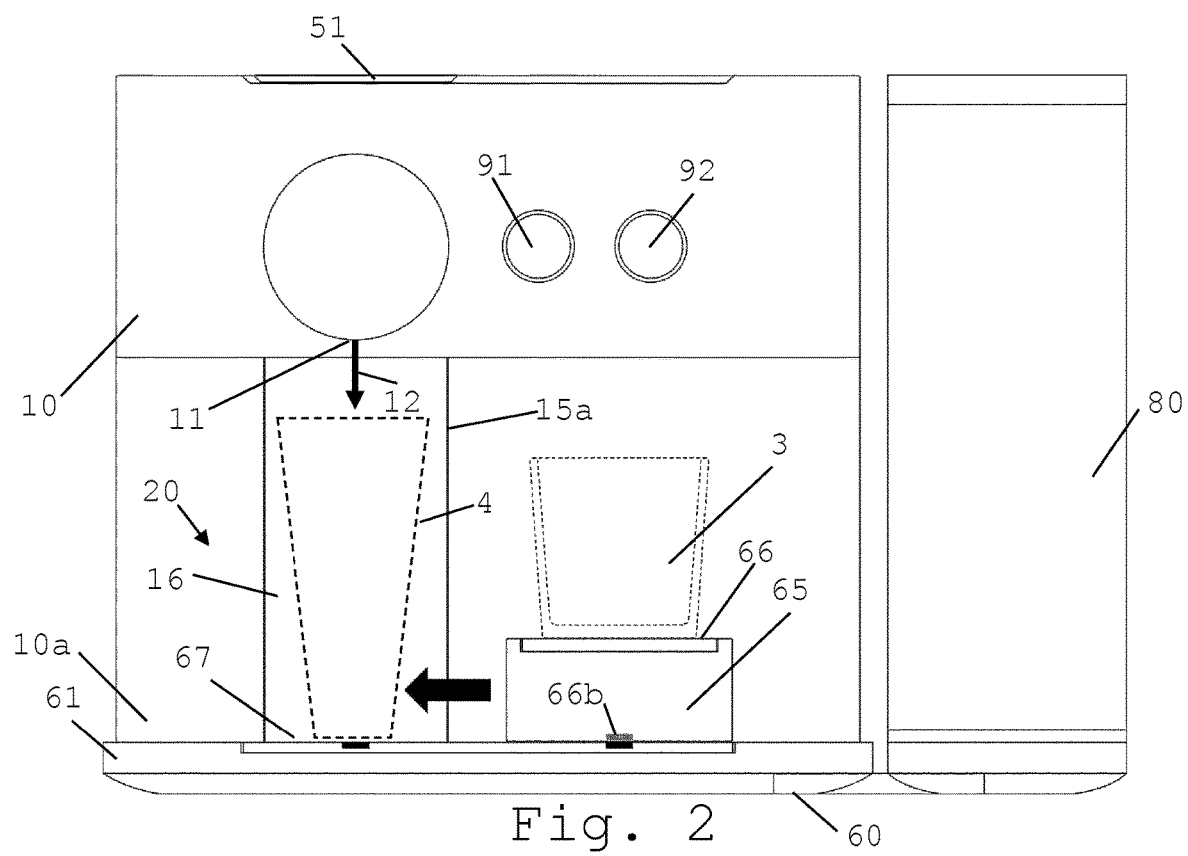

Machine 1 comprises a beverage outlet 11 located on external front face 10 and above a front area 20 for placing a user-receptacle 3,4 for collecting beverage 84 dispensed from the outlet 11. Front area 20 may include a movable user-receptacle support body 65, such as a support body 65 that is movable between a first position for placing a short user-receptacle 3 under outlet 11 and a second position for placing a large user-receptacle 4 under the outlet 11 (FIGS. 1 and 2).

Machine 1 has a capsule handling device 70 that is located behind external front face 10 and that is fluidically connected to outlet 11 (FIGS. 3a-3d and FIGS. 6-7). Device 70 includes a first part 71 and a second part 72 (FIG. 3a) that are relatively movable between a transfer position (FIGS. 3a-3b) for receiving and/or evacuating capsule 2 and an extraction position (FIGS. 3c-2d) for extracting capsule 2 between first and second parts 71,72.

For instance, first and second parts 71,72 are movable manually, such as by a user-handle (e.g. as disclosed in WO 2005/004683 or WO 2007/135136), and/or movable automatically, such as by a motor (e.g. as disclosed in EP1767129 or WO 2012/025258), between the transfer and the extraction positions.

First and second parts 71,72 may be arranged to form in the extraction position a mixing chamber 73 for housing capsule 2 (FIG. 3c-3d), e.g. a brewing chamber 73. For instance, chamber 73 is delimited by at least a cavity 71' in one part 71 of first and second parts 71,72 and by a cooperating cavity or lid 72' formed by the other part 72 of first and second parts 71,72 (FIG. 3a).

At least one part 72 of first and second parts 71,72 of capsule handling device 70 is arranged to translate towards and away from at least one of the two external lateral side faces 30,30' so that first and second parts 71,72 relatively move between the transfer and the extraction positions (FIGS. 3a-3d and 6-7).

As illustrated in FIGS. 3a-3d, downstream part 72 is movable towards and away from side face 30,30'. This corresponds to a configuration of a capsule handling device as for instance disclosed in WO 2012/025258. Obviously, it is possible to move the upstream part of the capsule handling device towards and away from side face 30,30', e.g. with a capsule handling device configuration as for instance disclosed in WO2007/135136. In a yet further alternative, it is also possible to have both the upstream and the downstream part moving towards and away from side faces 30,30'.

The at least one part 72 of first and second parts 71,72 that is arranged to translate towards and away from the at least one of the two external lateral side faces 30,30' can be configured to move generally in parallel to at least one of: external front face 10; external rear face 40; external top face 50; and external bottom face 60 (when present). See FIGS. 3a-3d and 6-7.

First and second parts 71,72 can be relatively movable between a transfer position for receiving and/or evacuating capsule 2 and an extraction position for extracting capsule 2 between first and second parts 71,72 along a translation axis 70' that intercepts at least one of first and second external lateral side faces 30,30' (FIGS. 3b and 3d). Translation axis 70' may extend generally in parallel to at least one of: external front face 10; external rear face 40; external top face 50; and external bottom face 60 (when present). See FIGS. 3b and 3d.

Machine 1 may include a fluid circuit for circulating beverage ingredient from capsule 2 when extracted between first and second parts 71,72. Fluid circuit can be fluidically connected to a source of liquid 80,80', such as a tank, and comprise a liquid driver 81, such as a pump, for driving liquid from source 80,80' into capsule handling device 70 for feeding the liquid to capsule 2, e.g. via a temperature conditioner (82), such as a heater and/or a cooler, and via an inlet of first or second part 71,72. See FIG. 3d.

Machine 1 can have a user-interface 90 configured to control liquid driver 81 to drive the liquid from source of liquid 80,80' into capsule handling device 70. See FIGS. 6-7.

Machine 1 may have one or more further user-interfaces 91,92 such as further user-interfaces 91,92 for setting at least one parameter relating to beverage preparation, power management and machine servicing. See FIGS. 1-2. Such beverage preparation parameters may relate to the beverage volumes, beverage temperatures as well as preparation sequences, such as beverages made of different phases such as more or less separate coffee and milk phases, e.g. cappuccinos and latte machiattos.

The at least one part 72 of first and second parts 71,72 that is arranged to translate towards and away from at least one of the two external lateral side faces 30,30' may be arranged to move generally in parallel to an overall direction of extraction 70' of the beverage ingredient in capsule 2 when extracted between first and second parts 71,72. See FIGS. 3*b* and 3*d*.

Machine 1 may include a fluid guide 83 for fluidically connecting capsule handling device 70 to outlet 11 along a guide direction 83', an overall direction of extraction 70' of the beverage ingredient in capsule 2 and a direction 12 of dispensing of beverage 84 out of outlet 11 extending along skew lines. For instance, dispensing direction 12 and guide direction 83' are in a plane that is generally orthogonal to the overall direction of extraction 70'. See FIG. 3*d*.

Machine 1 may include a foot 61,61' projecting in front of external front face 10 and extending along external front face 10 to form and/or support front area 20. See FIGS. 1-7.

Machine 1 may include a movable user-receptacle support body 65 that has an upper placement surface 66 and that is movable along external front face 10:
  from a first position at front area 20 under outlet 11 for supporting on upper placement surface 66 a short user-receptacle 3 under the outlet 11 (FIGS. 1, 6 and 7);
  to a second position away from under outlet 11 so that a large user-receptacle 4 is placeable on a lower placement surface 67 under outlet 11 (FIG. 2).

For instance foot 61,61' forms lower placement surface 67 and/or supports movable user-receptacle support body 65 in at least one of the first and second positions.

Movable user-receptacle support body 65 can be secured to external front face 10 and/or to foot 61,61'.

Machine 1 may include a connection means 68,69,69*a* for connecting user-receptacle support body 65 to external front face 10. User-receptacle support body 65 having a connector 66*a*,66*b* that is connected or connectable to connection means 68,69,69*a* to maintain user-receptacle body 65 in the first and second positions. For instance, connection means 68,69,69*a* guides user-receptacle body 65 from the first position into the second position and vice versa. See FIGS. 1, 6 and 7.

Connection means 68,69,69*a* can be located on external front face 10 and/or on foot 61,61' (FIGS. 1, 6 and 7).

Connection means 68,69,69*a* may have a direction 68' that extends generally along a bottom part 10*a* of external front face 10 so that user-receptacle support body 65 is movable with its connector 66*a*,66*b* in connection with connection means 68,69,69*a* from the first position into the second position and vice versa along direction 68' extending along bottom part 10*a*. For instance, direction 68' of connection means 68,69,69*a* extends on: the bottom part 10*a* of the external front face 10; and/or a front area 20 formed by a machine foot 61,61' projecting in front of bottom part 10*a* of external front face 10 and extending along external front face 10.

Machine 1 can have a machine bottom face 60, direction 68' of connection means 68,69,69*a* being generally parallel to bottom face 60 (FIG. 1).

Machine 1 may have two external spaced-apart lateral side faces 30,30', user-receptacle support body 65 being movable with its connector 66*a*,66*b* in connection with connection means 68,69,69*a* from the first position to the second position and vice versa along direction 68' from adjacent or close to one external lateral side face 30 to adjacent or close to the other external lateral side face 30 (FIGS. 1 and 7).

Connection means 68,69,69*a* may be provided with a mechanical arrangement comprising at least one of:
  a rail cooperating with a rail connector of the support body 65 and/or a groove 68 cooperating with a groove connector 66*a* of the support body 65, such as a rail slider and/or groove slider 66*a* of support body 65 having a single degree of freedom along the rail and/or the groove when connected thereto (FIGS. 1, 6 and 7), the rail and/or groove and the rail and/or groove slider having optionally a generally dovetail shape for cooperating together along a single degree of freedom;
  a belt or chain secured to the support body and movable along the external front face, such as a belt or chain in an open or closed loop; and
  a local releasable positioner for guiding the support body 65 into the first position or second position, such as a plug-and-socket positioner or a hook positioner or a snap positioner.

Connection means 69,69*a* can be provided with a magnetic arrangement so that connection means 69,69*a* and connector 66*b* are magnetically constrained (FIGS. 1, 6 and 7).

Connector 66*b* may include a magnetic field-generating element that is arranged to be magnetically constrained against a corresponding ferromagnetic element of the connection means 68,69*a*.

Connection means 68,69*a* can have a magnetic field-generating element that is arranged to be magnetically constrained against a corresponding ferromagnetic element of the connector 66*b*.

Connection means 68,69*a* may have a magnetic field-generating element that is arranged to be magnetically constrained against a corresponding magnetic field-generating element of the connector 66*b*.

Such magnetic field-generating element may include an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Such ferromagnetic element can be made of at least one of of Co, Fe, $Fe_2O_3$, $FeOFe_2O_3$, $NiOFe_2O_3$, $CuOFe_2O_3$, MgO $Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

Such magnetic field-generative element and/or such ferromagnetic element can be made of sub-elements dispersed in a polymer matrix or agglomerated with binder.

The connector can have one or more magnetic and/or ferromagnetic elements 66*b* (FIGS. 1-2), e.g. pin or rod or cylinder or prism or spot element, the connection means comprising:
  one or more magnetic and/or ferromagnetic local positioner elements 69*a*, e.g. pin or rod or cylinder or prism or spot element, on a path of connector 66*b* when user-receptacle support body 65 is moved between the first and second positions along direction 68' generally extending along bottom part 10*a*, such as at least one of discrete end-of-path positioners and intermediate positioners, e.g. a plurality of spaced apart positioners; and/or one or more path elements along a path of connector 66*b* when user-receptacle support body 65 is moved between first and second positions along direction 68' generally extending along the bottom part 10*a*, optionally the connection means 69,69*a* comprising stripe or bar or wire elements or a plurality of side-by-side local positioner elements 69 along direction 68' to from a spotted path and/or end-of-path positioners 69 defining the first and second positions of user-receptacle support body 65.

Machine 1 may include a liquid reservoir 80,80', such as a water thank, the liquid reservoir being in fluid connection with the fluid circuit (FIGS. 1-2 and 6-7).

Liquid reservoir 80,80' can be removable from such machine 1 for servicing, such as for filling, emptying and/or cleaning.

Liquid reservoir 80,80' may be mounted on a machine foot 61' (FIG. 7 in dashed lines), which machine foot 61' projects beyond:
- at least one of the external lateral side faces 30', reservoir 80' being located adjacent to at least one of the external side faces 30';
- the external front face, the reservoir being located adjacent to the external front face; or
- the external rear face, the reservoir being located adjacent to the external rear face.

Liquid reservoir 80,80' can have a shape that extends over substantially at least one of the entire external lateral side face 30' and and/or over substantially the entire external rear face (FIG. 7).

The shape of liquid reservoir 80' may be generally parallelpipedic (FIG. 7 in dashed lines).

Liquid reservoir 80 may have a shape that is generally cylindrical with a circular or part-circular or crescent or elliptic or semi-elliptic base (FIG. 6-7).

Machine 1 can have a seat 15 for receiving a removable service unit 16 via an opening 15*a* in external front face 10 (FIGS. 1-2 and 4-5).

Service unit 16 may have a receptacle for collecting waste material, such as capsules 2 upon use, and/or residual liquid.

Service unit 16 can have a feeder for supplying the beverage ingredient capsules and/or another ingredient for forming the beverage to be dispensed and/or a cleaning agent.

Service unit 16 may be prevented from being removed or inserted into seat 15 by user-receptacle support body 65 when support body 65 is adjacent to and in front of the opening 15*a* (FIGS. 1-2 and 4-5):
- in the first position of body 15*a*, service unit 16 being removable or insertable into seat 15 when support body 65 is in the second position; or
- in the second position of body 15*a*, service unit 16 being removable or insertable into seat 15 when support body 65 is in the first position.

External top face 50 may have a capsule insertion opening 51 leading into a passage 52 for guiding capsule 2 to capsule handling device 70 and to a position between first and second parts 71,72 of handling device 70 in the transfer position which parts are then relatively movable to their extraction position for extracting capsule 2. For instance, capsule insertion opening 51 is associated with a cover 55 that is movable adjacent to external housing 10,30,30',40, 50,60, such as slidable and/or pivotable, between an open position away from opening 51 for allowing insertion of capsule 2 into passage 52 via opening 51 and a closed position over or across opening 51 to prevent insertion of capsule 2 into passage 52 via opening 51. See FIGS. 1-2 and 6-7.

Machine 1 may include a user-interface 90 which is operable by a user to extract capsule 2 between first and second parts 71,72 in their extraction position.

User-interface 90 is covered by the cover 55 when cover 55 is in the open position so that user-interface 90 is inoperable by a user when capsule handling device 70 is accessible from outside via opening 51 and passage 52. See FIG. 7.

User-interface 90 is uncovered by cover 55 when cover 55 is in the closed position so that user-interface 90 is operable by a user when capsule handling device 70 is inaccessible from outside via opening 51 and passage 52. See FIG. 6.

For instance, user-interface 90 is configured to control driver 81, e.g. a pump, to drive liquid from source of liquid 80,80' into capsule handling device 70.

The invention claimed is:

1. A machine for dispensing a beverage from a capsule containing a beverage ingredient, the machine comprising:
    an external housing having an external front face, an external top face, and an external bottom face, the external housing further comprising two external spaced-apart lateral side faces that extend rearwards behind the external front face, the two external spaced-apart lateral side faces extend between the external top face and the external bottom face, the two external lateral side faces face each other;
    a beverage outlet located on the external front face and above a front area for placing a user-receptacle for collecting beverage dispensed from the beverage outlet; and
    a capsule handling device that is located behind the external front face, the capsule handling device is fluidically connected to the beverage outlet, the capsule handling device having a first part and a second part that are relatively movable between a transfer position for receiving and/or evacuating the capsule and an extraction position for extracting the capsule between the first and second parts; and
    at least one of the first and second parts of the capsule handling device is arranged to translate towards and away from at least one of the two external lateral side faces so that the first and second parts relatively move between the transfer position and the extraction position.

2. The machine of claim 1, wherein the at least one of the first and second parts that is arranged to translate towards and away from the at least one of the two external lateral side faces is configured to move generally in parallel to at least one of: the external front face; an external rear face; the external top face; and the external bottom face.

3. The machine of claim 1, wherein the first and second parts are relatively movable between the transfer position for receiving and/or evacuating the capsule and the extraction position for extracting the capsule between the first and second parts along a translation axis that intercepts at least one of the two external lateral side faces.

4. The machine of claim 1, comprising a fluid circuit for circulating the beverage ingredient from the capsule when extracted between the first and second parts, the fluid circuit being fluidically connected to a source of liquid, and the fluid circuit comprising a liquid driver configured to drive the liquid from the source into the capsule handling device for feeding the liquid to the capsule and via an inlet of the first part or the second part.

5. The machine of claim 4, wherein the at least one of the first and second parts arranged to translate towards and away from the at least one of the two external lateral side faces is arranged to move generally in parallel to an overall direction of extraction of the beverage ingredient in said capsule when the capsule is extracted between the first and second parts.

6. The machine of claim 5, comprising a fluid guide configured to fluidically connect the capsule handling device to the beverage outlet along a guide direction, and the overall direction of extraction and a direction of dispensing of the beverage out of the beverage outlet extend along skew lines.

7. The machine of claim 1, comprising a foot projecting in front of the external front face and extending along the external front face to form and/or support the front area.

8. The machine of claim 1, comprising a movable user-receptacle support body that has an upper placement surface and that is movable along the external front face:
from a first position at the front area under the beverage outlet for supporting on the upper placement surface a short user-receptacle under the beverage outlet; and
to a second position away from under the beverage outlet so that a large user-receptacle is placeable on a lower placement surface under the beverage outlet.

9. The machine of claim 8, wherein the movable user-receptacle support body is secured to the external front face and/or to a foot projecting in front of the external front face.

10. The machine of claim 8, comprising a connection member for connecting the user-receptacle support body to the external front face, the movable user-receptacle support body having a connector that is connected or connectable to the connection member to maintain the user-receptacle body in the first and second positions.

11. The machine of claim 4, comprising a liquid reservoir, the liquid reservoir being in fluid connection with the fluid circuit.

12. The machine of claim 1, comprising a seat for receiving a removable service unit via an opening in the external front face.

13. The machine of claim 2, wherein the external top face has a capsule insertion opening leading into a passage for guiding the capsule to the capsule handling device and to a position between the first and second parts of the capsule handling device in the transfer position, the first and second parts are then relatively movable to the extraction position for extracting the capsule.

14. The machine of claim 13, comprising a user-interface which is operable by a user to extract the capsule between the first and second parts in the extraction position, the user-interface is:
covered by a cover when the cover is in an open position so that the user-interface is inoperable by said user when the capsule handling device is accessible from outside via the capsule insertion opening and the passage; and
uncovered by the cover when the cover is in a closed position so that the user-interface is operable by said user when the capsule handling device is inaccessible from outside via the capsule insertion opening and the passage.

15. The machine of claim 8, wherein when the movable user-receptacle support body is in the second position, the movable user-receptacle support body is adjacent to one of the external lateral side faces.

16. The machine of claim 10, wherein the connection member extends generally along a bottom part of the external front face.

17. The machine of claim 11, wherein the liquid reservoir extends over at least one of the two external lateral side faces and/or over the external rear face.

18. The machine of claim 1, wherein the external top face further comprises a capsule insertion opening, the capsule insertion opening leading into a passage configured for guiding the capsule to a position between the first part and the second part of the capsule handling device in the transfer position.

19. The machine of claim 18, wherein the capsule insertion opening further comprises a cover that is relatively movable adjacent to the external housing between an open position and a closed position, the open position for allowing for insertion of the capsule into the passage through the capsule insertion opening, and the closed position covering the capsule insertion opening prevent insertion of the capsule into the passage through the capsule insertion opening.

* * * * *